May 8, 1923.
G. D. ANGLE
1,454,594
ADJUSTABLE COUPLING FOR MAGNETO DRIVES
Filed Aug. 1, 1921
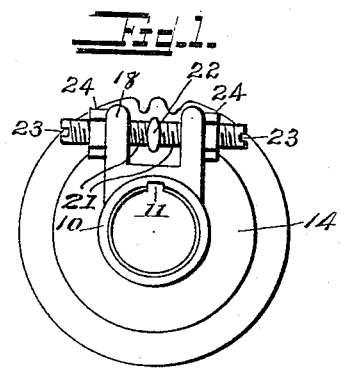
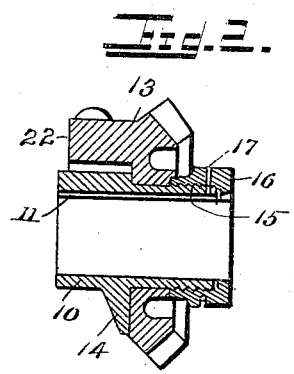
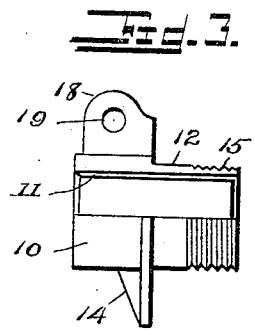
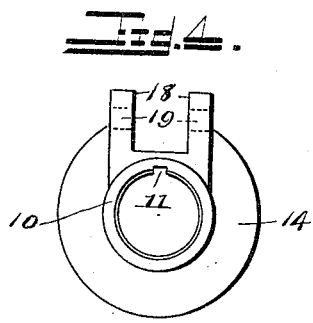
Inventor
Glenn D. Angle
By Robert H. Young
Attorney Patented May 8, 1923.

1,454,594

UNITED STATES PATENT OFFICE.

GLENN D. ANGLE, OF DAYTON, OHIO.

ADJUSTABLE COUPLING FOR MAGNETO DRIVES.

Application filed August 1, 1921. Serial No. 489,101.

*To all whom it may concern:*

Be it known that I, GLENN D. ANGLE, a citizen of the United States, residing at Dayton, in the county of Montgomery and State of Ohio, have invented certain new and useful Improvements in Adjustable Couplings for Magneto Drives, of which the following is a specification.

This invention relates to an improved type of coupling particularly adapted to be used in connecting a magneto or the like to a driving member so that the ignition device will operate in proper timed relation to the crank shaft of the internal combustion engine.

The primary object of my invention is to provide a coupling of this type of simple and sturdy construction, which will afford a fine adjustment.

It is not my intention to limit this invention to use in connection with the ignition systems of internal combustion engines as this type of coupling may be applied wherever it is desired to operate driving and driven members in a definite timed relation.

Other objects of the invention, consisting of novel features of construction and arrangements of parts, will become apparent on reference to the subjoined specification which describes the invention in connection with the accompanying drawings.

In the drawings:

Figure 1 is an end elevation of the coupling device in assembled condition.

Figure 2 is a central vertical section through the coupling.

Figure 3 is a partial side elevation and part sectional view of the hub or sleeve of the coupling device.

Figure 4 is an end elevation of the hub or sleeve.

Like numerals of reference indicate corresponding parts throughout the several views of the drawing.

The numeral 10 designates a hub or sleeve provided with a keyway 11 whereby said sleeve is adapted to be secured upon a shaft, such as a magneto shaft (not shown). As the sleeve is keyed on the shaft it may be termed a driven member. The sleeve 10 is formed with a plain cylindrical surface 12 upon which a bevel gear 13 is loosely mounted. The gear 13 is driven by suitable means from the crank shaft of the engine. Within the broad aspect of this invention the gear 13 typifies any driving member. An interrupted shoulder or flange 14 located at the rear of surface 12 extends from the sleeve 10 and thus forms a rear abutment for the gear 13. Screw threads 15 formed on the forward end of the sleeve terminate at the plain surface 12. A nut 16 engages the threads 15 and is threaded thereon to a point where it does not bind the gear. The latter is thus held loosely, or in floating relation, on the bearing surface 12 between the flange 14 and retaining nut 16. The nut is preferably held in position by a spring lock wire 17 or other suitable locking means.

The interrupted flange or shoulder 14 terminates in spaced arms 18 which thus form a yoke extension of the sleeve 10. The arms 18 are provided with opposite apertures 19 which are tapped for receiving set screws 21. A lug 22 projecting from the rear face of the gear 13 and inserted in the space between the arms 18 is adapted to be engaged on opposite sides by the set screws 21. The latter have transverse slots 23 formed in their outer ends so that a screw driver may be readily applied thereto. Lock nuts 24 mounted on the set screws 21 are tightened against the arms 18 for the purpose of holding the screws in adjusted position. The angle of relative movement between the hub or sleeve 10 and the gear 13 need only be equal to the angle between two adjacent gear teeth.

From the above description of the relation of the parts of my improved coupling it will be readily apparent how the same is applied in practical operation to give a fine timing adjustment. The engine crank shaft is turned until a piston is placed in correct position for the ignition of the explosive charge. The magneto is likewise adjusted so that the breaker is nearly in position to open when the spark lever is in retarded position. The lock nuts 24 being in suitable position, the screws 21 are adjusted by means of a screw driver whereby the sleeve 10 and magneto shaft keyed thereto are caused to rotate gradually in the desired direction until the circuit breaker is positioned to open at the position of the engine piston indicated above. The lock nuts 24 are then tightened and the synchronous relation between the crank shaft of the engine and the magneto is established and maintained.

Although I have described the preferred embodiment, it is evident that those skilled in the art to which this invention appertains may make various changes in the construction, combination and arrangement of the several parts without departing from the spirit and scope of the invention as defined in the appended claim.

I claim:

In a device of the class described, the combination of a sleeve having an abutment flange, a threaded portion, and a smooth cylindrical surface between and flange and threaded portion, a driving gear loosely mounted on said smooth surface for partial rotative movement, a nut on said threaded portion to retain the driving gear in position, and means for adjusting the driving gear axially around the sleeve embodying a lug extending laterally from the gear, arms extending tangentially from the sleeve and lying on opposite sides of said lug, and adjusting screws passing through said arms and bearing at their extremities against said lug.

In testimony whereof I have affixed my signature.

GLENN D. ANGLE.